(12) United States Patent
Kikuchi et al.

(10) Patent No.: US 10,491,803 B2
(45) Date of Patent: Nov. 26, 2019

(54) IMAGING ELEMENT, FOCUS DETECTION APPARATUS, AND FOCUS DETECTION METHOD

(71) Applicant: Olympus Corporation, Hachioji-shi, Tokyo (JP)

(72) Inventors: Tetsuo Kikuchi, Hachioji (JP); Yoshinao Shimada, Hino (JP); Masaki Higurashi, Hachioji (JP); Tetsuya Toyoda, Hachioji (JP)

(73) Assignee: Olympus Corporation, Tokyo (JP)

( * ) Notice: Subject to any disclaimer, the term of this patent is extended or adjusted under 35 U.S.C. 154(b) by 39 days.

(21) Appl. No.: 15/631,847

(22) Filed: Jun. 23, 2017

(65) Prior Publication Data

US 2017/0310880 A1 Oct. 26, 2017

Related U.S. Application Data

(63) Continuation of application No. PCT/JP2015/059193, filed on Mar. 25, 2015.

(30) Foreign Application Priority Data

Dec. 25, 2014 (JP) .................................. 2014-262631

(51) Int. Cl.
*H04N 5/232* (2006.01)
*H04N 5/345* (2011.01)
(Continued)

(52) U.S. Cl.
CPC ... *H04N 5/232122* (2018.08); *H04N 5/23212* (2013.01); *H04N 5/23245* (2013.01);
(Continued)

(58) Field of Classification Search
CPC ......... H04N 5/23212; H04N 5/232122; H04N 5/232127; H04N 5/23245; H04N 5/341;
(Continued)

(56) References Cited

U.S. PATENT DOCUMENTS 7,924,342 B2 *  4/2011  Kusaka ............... H04N 5/3696
                                                    348/208.12
8,259,215 B2 *  9/2012  Sugawara ............ H04N 5/367
                                                    348/335
(Continued)

FOREIGN PATENT DOCUMENTS

CN       102089698 A      6/2011
JP       2005-86245       3/2005
(Continued)

OTHER PUBLICATIONS

Extended European Search Report including the supplementary European Search Report and the European Search Opinion, to corresponding European application No. 15872315.5, dated May 4, 2018 (9 pgs.).

(Continued)

*Primary Examiner* — Daniel M Pasiewicz
(74) *Attorney, Agent, or Firm* — John C. Pokotylo; Pokotylo Patent Services

(57) ABSTRACT

An imaging element includes a plurality of imaging pixels each with a light receiver and a plurality of focus detection pixels each with a light receiver including an opening position different from opening positions in the imaging pixels. The imaging element includes a reading unit and a reading range setting unit. The reading unit reads pixel signals from the imaging pixels or the focus detection pixels. The reading range setting unit sets a reading range for the reading unit to read the pixel signals from the focus detection pixels.

9 Claims, 10 Drawing Sheets

(51) Int. Cl.
*H04N 5/343* (2011.01)
*H04N 5/369* (2011.01)
(52) U.S. Cl.
CPC ....... *H04N 5/232127* (2018.08); *H04N 5/343* (2013.01); *H04N 5/3456* (2013.01); *H04N 5/36961* (2018.08)
(58) Field of Classification Search
CPC ...... H04N 5/343; H04N 5/345; H04N 5/3456; H04N 5/3696; H04N 5/36961
See application file for complete search history.

(56) References Cited

U.S. PATENT DOCUMENTS

| | | | | |
|---|---|---|---|---|
| 2010/0165176 | A1* | 7/2010 | Taniguchi | G02B 7/34 348/345 |
| 2011/0096211 | A1 | 4/2011 | Oikawa | |
| 2011/0273608 | A1* | 11/2011 | Tsukada | G02B 7/36 348/345 |
| 2012/0092545 | A1* | 4/2012 | Sugawara | G02B 7/285 348/345 |
| 2012/0300104 | A1* | 11/2012 | Onuki | H04N 5/23212 348/302 |
| 2014/0168480 | A1* | 6/2014 | Okazawa | H04N 5/23212 348/241 |
| 2014/0320734 | A1 | 10/2014 | Funatsu | |

FOREIGN PATENT DOCUMENTS

| | | |
|---|---|---|
| JP | 2007-208685 | 8/2007 |
| JP | 2013-113857 | 6/2013 |
| JP | 2013-178564 | 9/2013 |
| JP | 2014-164231 | 9/2014 |
| JP | 2014-215551 | 11/2014 |
| WO | WO 2010/106846 | 9/2010 |

OTHER PUBLICATIONS

Translation of the International Preliminary Report on Patentability ("IPRP"), including the Written Opinion of the International Searching Authority, to corresponding International Application No. PCT/JP2015/059193, dated Jul. 6, 2017 (7 pgs.).

International Search Report to corresponding International Application No. PCT/JP/059193, dated Jun. 16, 2015 (3 pgs.), with translation (2 pgs.).

First Office Action to corresponding Japanese Patent Application Serial No. 2014-262631, dated Feb. 12, 2019 (3 pgs.), with translation (3 pgs.).

First Notification of Examination Opinion to corresponding Chinese Patent Application Serial No. 201580069723.X, dated Aug. 5, 2019 (11 pgs.), with translation (16 pgs.).

* cited by examiner

FIG. 2

IMAGING ELEMENT, FOCUS DETECTION APPARATUS, AND FOCUS DETECTION METHOD

CROSS-REFERENCE TO RELATED APPLICATIONS

This application is a Continuation Application of PCT Application No. PCT/JP2015/059193, filed Mar. 25, 2015 and based upon and claiming the benefit of priority from the prior Japanese Patent Application No. 2014-262631, filed Dec. 25, 2014, the entire contents of both of which are incorporated herein by reference.

BACKGROUND OF THE INVENTION

1. Field of the Invention

The present invention relates to an imaging element, a focus detection apparatus, and a focus detection method.

2. Description of the Related Art

An imaging apparatus that detects a focus state using some of the pixels of an imaging element as focus detection elements are known. Such an imaging apparatus configures certain pixels of an imaging element to be focus detection pixels, forms an image on the focus detection pixels from subject light fluxes that have passed through different pupil areas symmetrical with respect to the center of the optical axis of an imaging lens, and detects a phase difference between the subject light fluxes to thereby detect the focus state of the imaging lens.

Meanwhile, a so-called live-view display technique is known for imaging apparatuses. The live-view display is a technique to cause a display unit to display, in real time, images based on the pixel signals obtained at each pixel of an imaging element.

For combining such live-view display and focus detection, for example, the technique of Jpn. Pat. Appln. KOKAI Publication No. 2013-178564 is known. The imaging apparatus proposed by Jpn. Pat. Appln. KOKAI Publication No. 2013-178564 is configured to read pixel signals from imaging pixels for the live-view display and pixel signals from focus detection pixels for the focus detection in an alternating manner.

BRIEF SUMMARY OF THE INVENTION

An imaging element according to a first aspect of the invention is an imaging element including a plurality of imaging pixels each with a light receiver and a plurality of focus detection pixels each with a light receiver including an opening position different from opening positions in the imaging pixels, and the imaging element comprises: a reading unit which reads pixel signals from the imaging pixels or the focus detection pixels; and a reading range setting unit which sets a reading range for the reading unit to read the pixel signals from the focus detection pixels.

A focus detection device to a second aspect of the invention is a focus detection device with an imaging element, the imaging element including a plurality of imaging pixels each with a light receiver and a plurality of focus detection pixels each with a light receiver including an opening position different from opening positions in the imaging pixels, comprises: a reading unit which reads pixel signals from the imaging pixels or the focus detection pixels frame by frame; a reading range setting unit which sets a reading range for the reading unit to read the pixel signals from the focus detection pixels; and a controller which performs a focus detection operation based on the pixel signals read from the focus detection pixels, wherein the reading unit alternately reads the pixel signals from the imaging pixels and the pixel signals from the focus detection pixels in the reading range set by the reading range setting unit.

A focus detection method according to a third aspect of the invention is a focus detection method using a focus detection device with an imaging element, the imaging element including a plurality of imaging pixels each with a light receiver and a plurality of focus detection pixels each with a light receiver having an opening position different from opening positions in the imaging pixels, the focus detection method comprising: setting a reading range for reading pixel signals from the focus detection pixels; alternately reading, frame by frame, pixel signals from the imaging pixels and the pixel signals from the focus detection pixels in the set reading range; and performing a focus detection operation based on the pixel signals read from the focus detection pixels.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 2 is a diagram showing one exemplary arrangement of focus detection pixels in an imaging element;

DETAILED DESCRIPTION OF THE INVENTION

Hereinafter, embodiments of the present invention will be described with reference to the drawings.

First Embodiment

Figure 1:
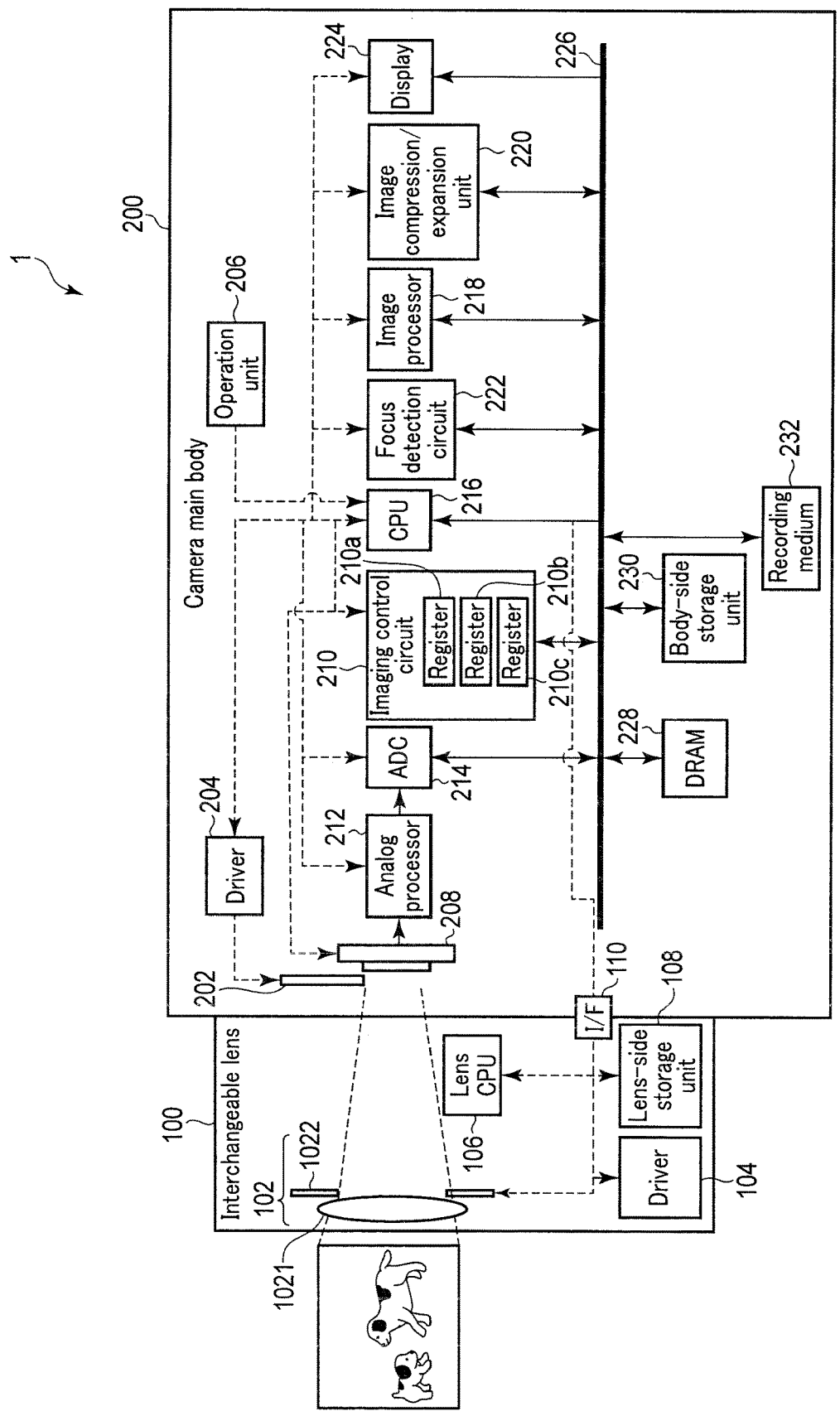
FIG. 1 is a block diagram showing one exemplary configuration of a camera system according to each embodiment of the present invention.

A first embodiment of the present invention will be described. FIG. 1 is a block diagram showing one exemplary configuration of a camera system according to each embodiment of the present invention. In FIG. 1, solid lines with arrows indicate the flow of data, and broken lines with arrows indicate the flow of control signals.

A camera system 1 shown in FIG. 1 comprises an interchangeable lens 100 and a camera main body 200. The interchangeable lens 100 is configured to be attached to and detached from the camera main body 200. When the interchangeable lens 100 is attached to the camera main body 200, they are communicably connected to each other.

The interchangeable lens 100 comprises an imaging lens 102, a driver 104, a lens CPU 106, and a lens-side storage unit 108.

The imaging lens 102 is an imaging optical system for forming subject light fluxes into an image on an imaging element 208 of the camera main body 200. This imaging lens 102 comprises a focus lens 1021 and an aperture 1022. The focus lens 1021 is configured to move in an optical axis direction to adjust the focus position of the imaging lens 102. The aperture 1022 is disposed on the optical axis of the focus lens 1021 and has a variable diameter. The aperture 1022 limits the amount of subject light fluxes having passed through the focus lens 1021. The driver 104 drives the focus lens 1021 and the aperture 1022 based on control signals from the lens CPU 106. The imaging lens 102 may be configured as a zoom lens, and in this case, the driver 104 also performs zoom driving.

The lens CPU 106 is configured to communicate with a CPU 216 of the camera main body 200 via an interface (I/F) 110. This lens CPU 106 controls the driver 104 according to the control of the CPU 216. Also, the lens CPU 106 sends information such as the aperture value (F number) of the aperture 1022 and the lens data stored in the lens-side storage unit 108 to the CPU 216 via the I/F 110.

The lens-side storage unit 108 stores the lens data for the interchangeable lens 100. The lens data includes, for example, information about the focal distance of the imaging lens 102 and information about aberration.

The camera main body 200 includes a mechanical shutter 202, a driver 204, an operation unit 206, the imaging element 208, an imaging control circuit 210, an analog processor 212, an analog-to-digital converter (ADC) 214, the CPU 216, an image processor 218, an image compression/expansion unit 220, a focus detection circuit 222, a display 224, a bus 226, a DRAM 228, a body-side storage unit 230, and a recording medium 232.

The mechanical shutter 202 is configured to be capable of opening and closing to adjust the incident time of the subject light fluxes from a subject into the imaging element 208 (exposure time of the imaging element 208). As the mechanical shutter 202, known focal plane shutters or lens shutters may be employed. The driver 204 drives the mechanical shutter 202 based on control signals from the CPU 216.

The operation unit 206 includes various operational buttons such as a power supply button, a release button, a movie button, a replay button, and a menu button, as well as various operational components such as a touch panel. The operation unit 206 detects the operational state of the various operational components and outputs the signals indicative of the detection results to the CPU 216.

The imaging element 208 is disposed behind the mechanical shutter 202 on the optical axis of the imaging lens 102, and at the position where the imaging lens 102 forms an image from subject light fluxes. The imaging element 208 comprises two-dimensionally arranged light receivers (for example, photodiodes) that form pixels. The light receivers constituting the imaging element 208 each generate an electric charge corresponding to the amount of received light. The electric charges generated at the light receivers are accumulated in capacitors connected to the respective light receivers. The electric charges accumulated in the capacitors are read as pixel signals based on control signals from the imaging control circuit 210. In this embodiment, the imaging element 208 is configured so that the pixel signals can be read row by row.

Figure 2:
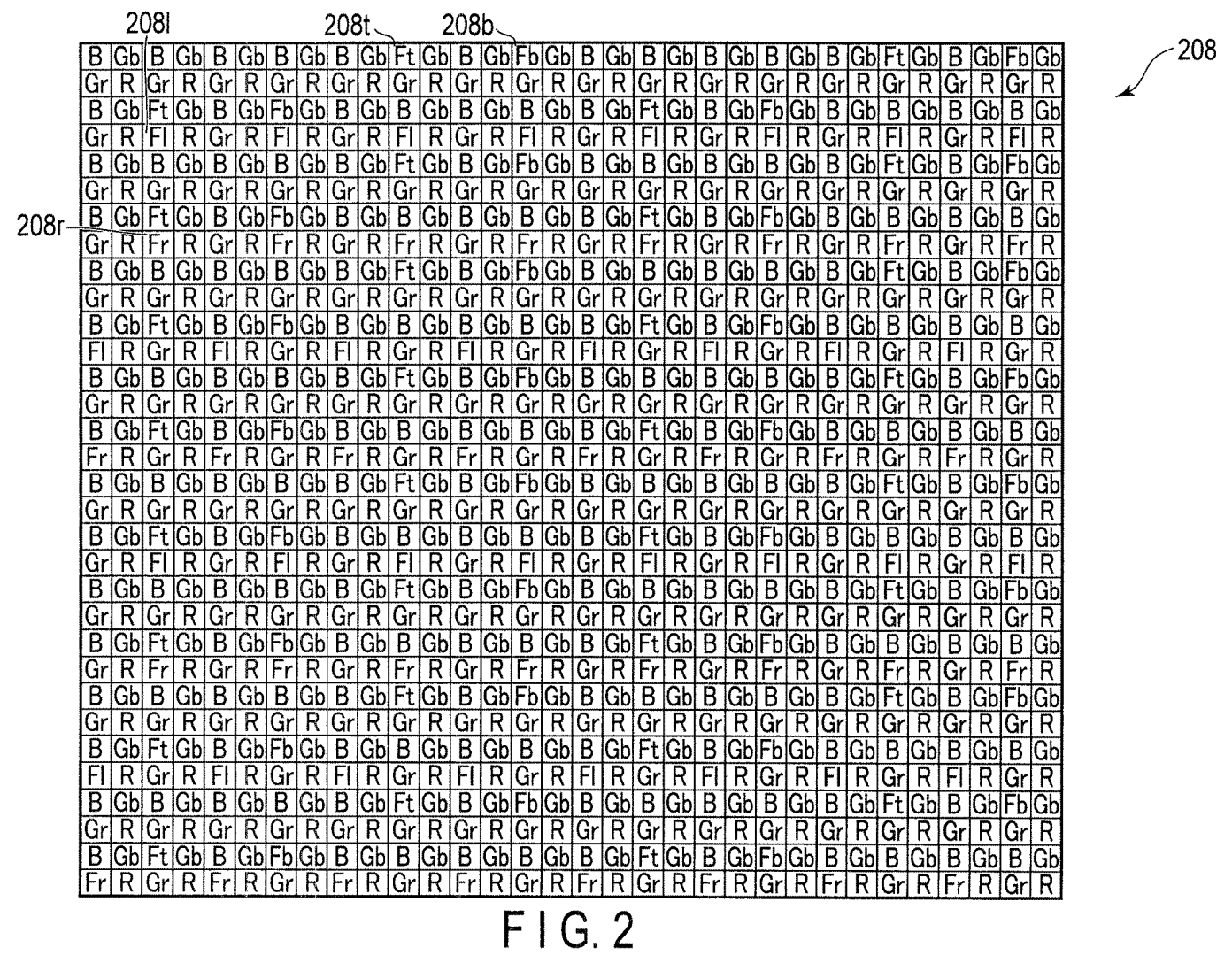

Also, the imaging element 208 of the present embodiment includes, as the pixels, imaging pixels for acquiring images to record and display, and focus detection pixels for performing focus detection. The focus detection pixel is a pixel with a light receiver having an opening position different from those in the imaging pixels. FIG. 2 is a diagram showing an exemplary arrangement of the focus detection pixels in the imaging element 208. One exemplary color filter arrangement of the imaging element 208 is the Bayer arrangement. The Bayer arrangement is constituted by two-dimensionally arranged filter units each comprising four pixels, namely, R, Gr, Gb, and B.

In the example of FIG. 2, the positions of specific Gr pixels form horizontal pixel arrays. The horizontal pixel arrays each include focus detection pixels 208r and 208l. The focus detection pixel 208r (denoted as Fr in the drawing) is a pixel having a light-blocked region on the left half face and an opened region on the right half face. The focus detection pixel 208l (denoted as Fl in the drawing) is a pixel having a light-blocked region on the right half face and an opened region on the left half face. Looking at one horizontal pixel array, the focus detection pixels 208r and the focus detection pixels 208l are each disposed horizontally and vertically away from others by four pixel pitches. The odd-numbered horizontal pixel arrays and the even-numbered horizontal pixel arrays are displaced from each other by two pixel pitches.

Also, as shown in FIG. 2, the positions of specific B pixels form vertical pixel arrays. The vertical pixel arrays each include focus detection pixels 208t and 208b. The focus detection pixel 208t (denoted as Ft in the drawing) is a pixel having a light-blocked region on the bottom half face and an opened region on the top half face. The focus detection pixel 208b (denoted as Fb in the drawing) is a pixel having a light-blocked region on the top half face and an opened region on the bottom half face. In one vertical pixel array, the focus detection pixels 208t and the focus detection pixels 208b are each disposed horizontally and vertically away from others by four pixel pitches. The odd-numbered vertical pixel arrays and the even-numbered vertical pixel arrays are displaced from each other by two pixel pitches. That is, in the example of FIG. 2, the vertical pixel arrays are provided at the positions corresponding to the horizontal pixel arrays when rotated by 90 degrees.

The imaging control circuit 210 that functions as a reading unit controls exposure of the imaging element 208 and reading of pixel signals from the imaging element 208, in accordance with the setting of reading pixel signals from the imaging element 208. This imaging control circuit 210 comprises registers 210a, 210b, and 210c. The register 210a, together with the register 210b, functions as a reading range setting unit. The register 210a is a register for setting a start position of the reading range for the pixel signals from the focus detection pixels at the time of AF exposure (described later). Also, the register 210b is a register for setting widths of the reading range. The register 210b comprises a register for the horizontal pixel arrays and a register for the vertical pixel arrays and functions also as a read pixel setting unit. Furthermore, the register 210c functions as a frame setting unit. The register 210c is a register for setting a frame for reading the pixel signals from the focus detection pixels. Details of these registers will be described later.

The analog processor 212 performs analog processing such as amplification processing to the pixel signals read from the imaging element 208 according to the control of the imaging control circuit 210. The ADC 214 converts the pixel signals output from the analog processor 212 into digital pixel signals (pixel data). In the following descriptions, a group of pixel data is referred to as imaging data.

The CPU 216 performs total control of the camera system 1 based on a program stored in the body-side storage unit 230. The image processor 218 applies various image processing to the imaging data and generates image data. For example, to record a still image, the image processor 218 applies image processing for recording still images and generates still image data. Similarly, to record a moving image, the image processor 218 applies image processing for recording moving images and generates moving image data. To display a live-view, the image processor 218 applies image processing for display and generates display image data. For this live-view display, the image processor 218 also performs correction processing to the pixel data from the focus detection pixels. Part of the region on the focus detection pixels is blocked from light as described above. Therefore, the focus detection pixels give rise to a decreased amount of light. The image processor 218 corrects this decreased light amount. This correction includes, for example, processing to apply to the pixel data acquired from a focus detection pixel a gain corresponding to the decreased light amount, and processing to perform interpolation using the pixel data of same-color imaging pixels around a focus detection pixel.

To record image data, the image compression/expansion unit 220 compresses the image data (still image data or moving image data) generated by the image processor 218. Also, to reproduce image data, the image compression/expansion unit 220 expands the image data compressed and recorded in the recording medium 232.

The focus detection circuit 222 acquires pixel data from the focus detection pixels and calculates, based on the acquired pixel data, a defocus direction and a defocus amount with respect to the focusing position of the focus lens 1021 by the known phase difference method. That is, the focus detection circuit 222 calculates the defocus direction and the defocus amount with respect to the focusing position of the focus lens 1021, based on the phase difference between the pixel data acquired from the respective focus detection pixels 208r and the pixel data acquired from the respective focus detection pixels 208l in the horizontal pixel array. The focus detection circuit 222 also calculates the defocus direction and the defocus amount with respect to the focusing position of the focus lens 1021, based on the phase difference between the pixel data acquired from the respective focus detection pixels 208t and the pixel data acquired from the respective focus detection pixels 208b in the vertical pixel array.

The display 224 is a display unit such as a liquid crystal display or an organic EL display, and is disposed at, for example, the back of the camera main body 200. The display 224 displays images following the control of the CPU 216. The display 224 is used for displaying the live-view, recorded images, and so on.

The bus 226 is connected to the ADC 214, the CPU 216, the image processor 218, the image compression/expansion unit 220, the focus detection circuit 222, the DRAM 228, the body-side storage unit 230, and the recording medium 232, and functions as a transfer path for transferring various data generated in these blocks.

The DRAM 228 is an electrically rewritable memory, and temporarily stores various data such as the aforementioned imaging data (pixel data), image data for recording, image data for display, and processed data in the CPU 216. An SDRAM may also be employed for transitory storage.

The body-side storage unit 230 stores programs used in the CPU 216, and various data such as adjustment values of the camera main body 200.

The recording medium 232 is embedded in or formed to be insertable into the camera main body 200, and records the image data for recording as an image file of a predetermined format.

Figure 3:
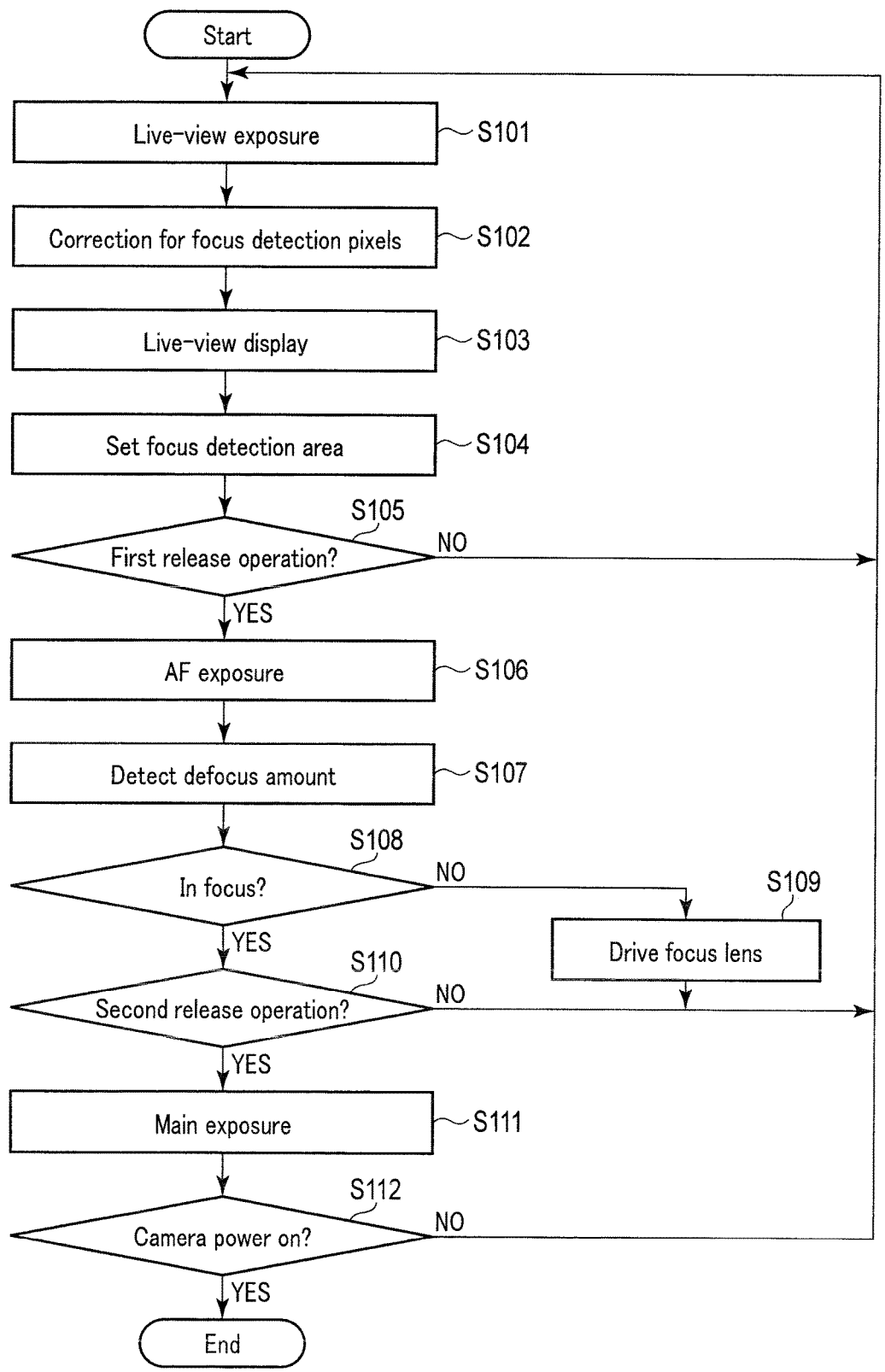
FIG. 3 is a flowchart showing an Auto Focus (hereinafter AF) operation of a camera system.

The AF operation of the camera system 1 according to this embodiment will be described below. FIG. 3 is a flowchart showing the AF operation of the camera system 1. Processing shown in the flowchart of FIG. 3 is performed by the CPU 216 based on the program stored in the body-side storage unit 230.

The processing in the flowchart of FIG. 3 is started upon, for example, turning on of a power for the camera main body 200. In step S101, the CPU 216 starts exposure for live-view. The exposure for live-view is an exposure process for acquiring imaging data for live-view display. In the exposure for live-view, the CPU 216 sends a control signal to the imaging control circuit 210. Upon receipt of the control signal, the imaging control circuit 210 starts the exposure of the imaging element 208. After the exposure, the imaging control circuit 210 reads pixel signals from each pixel in the imaging element 208 in a mixed manner or in a thinned-out manner. As a result, the imaging data is stored in the DRAM 228.

In step S102, the image processor 218 performs correction processing to the pixel data from the focus detection pixels. This correction processing allows the pixel data from the focus detection pixels to be used in a manner similar to the pixel data from the imaging pixels. After this correction processing, the image processor 218 performs other processing required for generating display image data to generate the display image data.

In step S103, the CPU 216 performs live-view display. That is, the CPU 216 causes the display 224 to display live-view images based on the display image data generated by the image processor 218.

In step S104, the CPU 216 sets a focus detection area. The focus detection area is set by, for example, a user's operation with the operation unit 206. Modes for setting the focus detection areas according to the present embodiment include a single-target mode, a group-target mode, and an all-target mode. The single-target mode is a mode to target any one area in an image for the focus detection. The group-target mode is a mode to target any multiple adjacent areas in an image for the focus detection. The all-target mode is a mode to target all areas in an image for the focus detection. Here, one area is formed of a plurality of adjacent pixels.

In step S105, the CPU 216 determines whether or not a first release operation is performed by a user. The first release operation is, for example, an operation to half press a release button. In step S105, if it is determined that the first release operation is not performed, the processing returns to step S101. If it is determined in step S105 that the first release operation is performed, the processing proceeds to step S106.

In step S106, the CPU 216 executes AF exposure. The AF exposure is an exposure process for acquiring pixel data for the focus detection. In the present embodiment, the exposure for live-view and the AF exposure are alternately performed frame by frame. Also, according to the AF exposure in this embodiment, the reading range for pixel signals is set based on the setting of the focus detection area. This embodiment enables fast live-view display by limiting reading of the pixel signals from the focus detection pixels in accordance with the reading range. The fast live-view display here means, for example, the live-view display at 120 fps, which is faster than 60 fps as a general frame rate for display. Processing of the AF exposure will be detailed later.

In step S107, the focus detection circuit 222 calculates a defocus direction and a defocus amount with respect to the focusing position of the focus lens 1021 by the known phase difference method, using the pixel data acquired from the focus detection pixels.

In step S108, the CPU 216 determines whether or not the focus lens 1021 is in focus. Whether or not the focus lens 1021 is in focus is determined by, for example, determining whether or not the defocus amount is within a predetermined allowance. In step S108, if it is not determined that the focus lens 1021 is in focus, the processing proceeds to step S109. If it is determined in step S108 that the focus lens 1021 is in focus, the processing proceeds to step S110.

In step S109, the CPU 216 sends an instruction to the lens CPU 106 so that the focus lens 1021 will be driven in accordance with the defocus direction and the defocus amount. Responsive to this instruction, the lens CPU 106 drives the focus lens 1021 via the driver 104. The processing then returns to step S101.

In step S110, the CPU 216 determines whether or not a second release operation is performed by a user. The second release operation is, for example, an operation to fully press the release button. In step S110, if it is determined that the second release operation is not performed, the processing returns to step S101. If it is determined in step S110 that the second release operation is performed, the processing proceeds to step S111.

In step S111, the CPU 216 starts main exposure. The main exposure is an exposure process to acquire imaging data for recording. In the main exposure, the CPU 216 sends a control signal to the imaging control circuit 210. Upon receipt of the control signal, the imaging control circuit 210 starts the exposure of the imaging element 208. After the exposure, the imaging control circuit 210 reads pixel signals from each pixel in the imaging element 208. As a result, the imaging data is stored in the DRAM 228. Thereafter, the image processor 218 performs processing for correcting the pixel output of the focus detection pixels and generating other image data for recording. Subsequently, the image compression/expansion unit 220 compresses the image data for recording. Then, the CPU 216 records the compressed image data for recording in the recording medium 232 as an image file.

In step S112, the CPU 216 determines whether or not the power for the camera main body 200 should be turned off. For example, if an instruction to turn off the power is given by the user's operation with the operation unit 206, or if the operation unit 206 has not been operated by a user for a predetermined period, the CPU 216 determines that the power should be turned off. In step S112, if it is determined that the power for the camera main body 200 should not be turned off, the processing returns to step S101. If it is determined in step S112 that the power supply for the camera main body 200 should be turned off, the processing ends.

Figure 4:
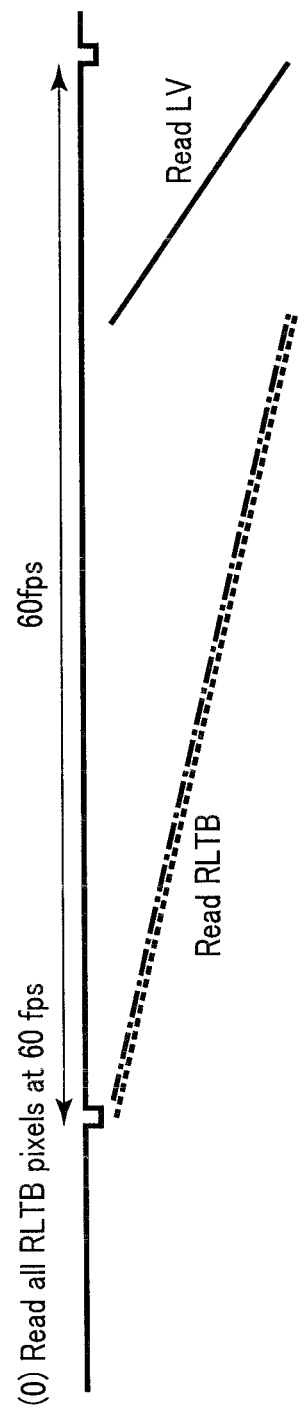
FIG. 4 is a timing chart for reading pixel signals in the exposure processing at a general frame rate for display, i.e. 60 fps.

Hereinafter, the AF exposure according to the present embodiment will be described. Prior to describing the AF exposure according to this embodiment, AF exposure in the case of 60 fps as a general frame rate for display will be illustrated in FIG. 4. As shown in FIG. 4, one frame cycle is entirely occupied by the operation of AF exposure to read pixel signals from all the pixels including focus detection pixels and the operation of exposure for live-view. As such, accelerating the frame rate is difficult. In the present embodiment, in order to reduce the time to read pixel signals in the AF exposure, a reading range for pixel signals is set in accordance with the focus detection area set by a user. This reading range is set with a start position SH and widths WRL and WTB. The start position is a position at which the reading range starts, and given as a position with reference to the upper end of an image. The examples below will assume that the start position takes a value 0 at the upper end and a value 100 at the lower end. Also, the width WRL is a vertical width of the reading range for horizontal pixel arrays. Furthermore, the width WTB is a vertical width of the reading range for vertical pixel arrays. In the examples below, the widths WRL and WTB will be expressed in a percentage based on the vertical width of an image. In that context, 0% width will mean reading no pixel signals, and 100% width will mean reading pixel signals from the entire range.

The technique to set the reading range in the single-target mode or the group-target mode will be described. As discussed, in the single-target mode, only one area in an image is set as a focus detection area. In the group-target mode, an area group constituted by multiple adjacent areas (e.g., 9 areas) in an image is set as a focus detection area. And in the single-target mode or the group-target mode, the focus detection can be performed upon successfully reading the pixel signals from the set focus detection area. Accordingly, in the single-target mode or the group-target mode, the reading range covers the set focus detection area, and the reading range is set to have essentially the same width as this focus detection area.

Figure 5:
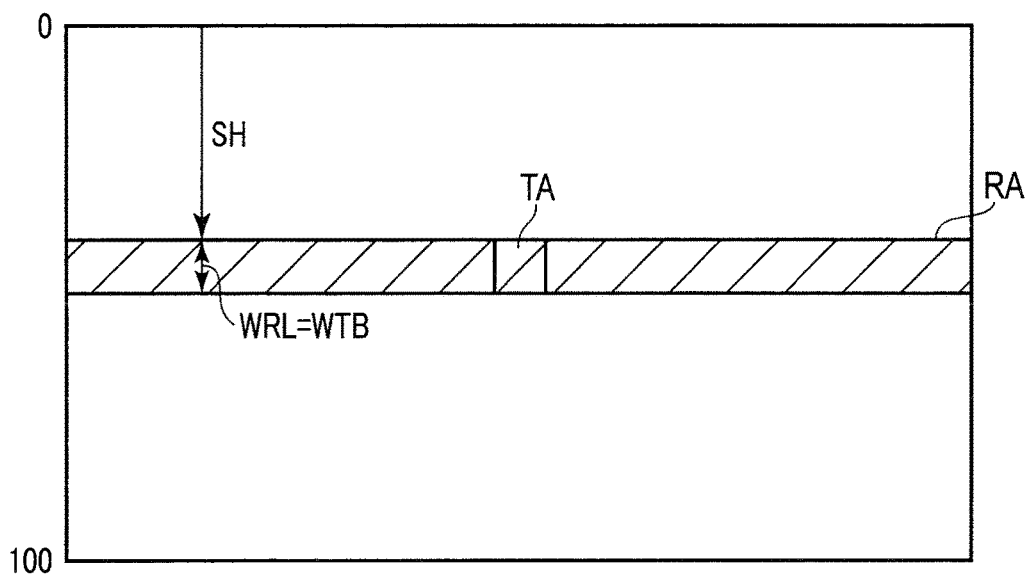
FIG. 5 is a diagram showing an exemplary setting of the reading range in a single-target mode.

FIG. 5 shows an exemplary setting of a reading range RA in the single-target mode. When in the single-target mode, the CPU 216 sets an upper end position of a focus detection area TA to the register 210a of the imaging control circuit 210, as the start position SH. The CPU 216 also sets a vertical width of the focus detection area TA to the register 210b of the imaging control circuit 210, as the width WRL and the width WTB. The CPU 216 further sets a configuration to the register 210c of the imaging control circuit 210 so that the pixel signals for focus detection will be read from the focus detection pixels every two frames. When such settings have been done in the respective registers 210a, 210b, and 210c, the imaging control circuit 210 reads the pixel signals from each focus detection pixel in the horizontal pixel arrays and the vertical pixel arrays in the reading range RA every two frames, i.e. for each AF exposure processing.

Figure 6:
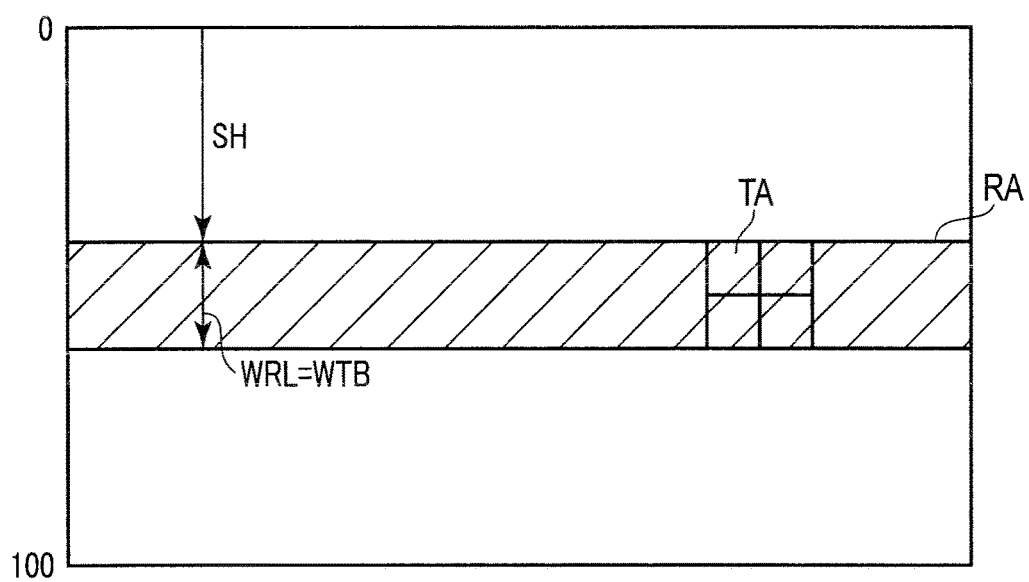
FIG. 6 is a diagram showing an exemplary setting of the reading range in a group-target mode.

FIG. 6 shows an exemplary setting of a reading range RA in the group-target mode. When in the group-target mode, the CPU 216 sets an upper end position (uppermost end of multiple areas) of a focus detection area TA to the register 210a of the imaging control circuit 210, as the start position SH. The CPU 216 also sets a vertical width (distance from the uppermost end to the lowermost end of the multiple areas) of the focus detection area TA to the register 210b of the imaging control circuit 210, as the width WRL and the width WTB. The CPU 216 further sets a configuration to the register 210c of the imaging control circuit 210 so that the pixel signals for focus detection will be read from the focus detection pixels every two frames. When such settings have been done in the respective registers 210a, 210b, and 210c, the imaging control circuit 210 reads the pixel signals from each focus detection pixel in the horizontal pixel arrays and the vertical pixel arrays in the reading range RA every two frames, i.e. for each AF exposure processing.

In the single-target mode or the group-target mode, the reading range for pixel signals accounts for only a partial area. Therefore, the time to read pixel signals is greatly reduced. Since the time to read pixel signals is reduced, fast live-view display and focus detection can both be achieved. Moreover, in the set focus detection area, focus detection is performed with both the horizontal pixel arrays and the vertical pixel arrays. Therefore, the focus detection can be performed with high precision.

Next, the technique to set the reading range in the all-target mode will be described. As previously discussed, in the all-target mode, the focus detection area is set to cover all the areas in an image. As such, the reading range cannot be limited by the technique similar to the case of the single-target mode or the group-target mode. Therefore, in the all-target mode, the width of the reading range is set individually for the horizontal pixel arrays and for the vertical pixel arrays in accordance with the imaging scene at the first release operation.

Figure 7A:
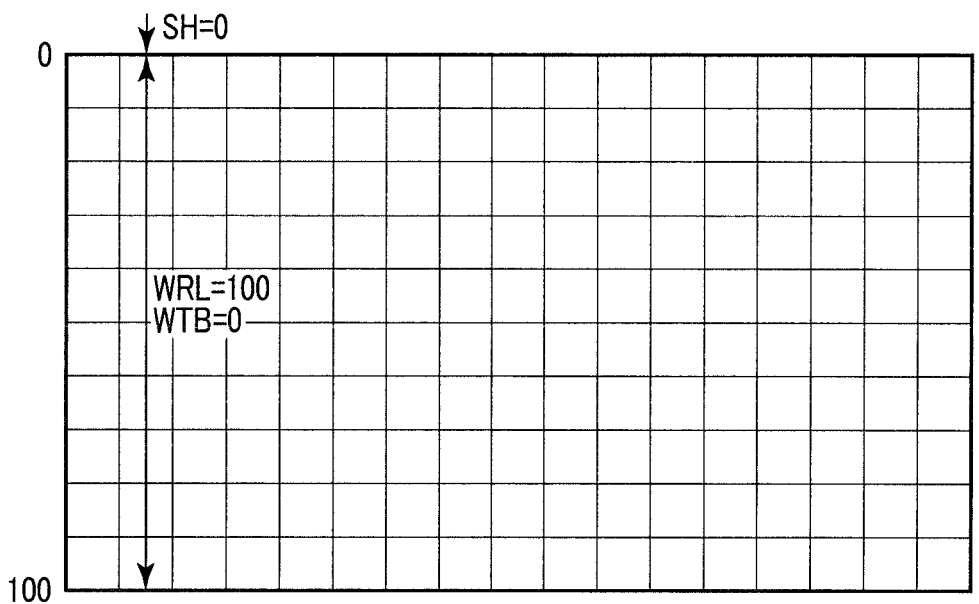
FIG. 7A is a diagram showing a first exemplary setting of the reading range in an all-target mode.

First, if the imaging scene just before AF exposure is determined to be an imaging scene including a subject that allows for stable detection of vertical lines, it can be assumed that use of the horizontal pixel arrays would enable more precise focus detection. Accordingly, the reading range is set as shown in FIG. 7A. That is, the CPU 216 sets 0 (upper end of the image) to the register 210a of the imaging control circuit 210, as the start position SH. The CPU 216 also sets 100% as the width WRL and 0% as the width WTB to the register 210b of the imaging control circuit 210. The CPU 216 further sets a configuration to the register 210c of the imaging control circuit 210 so that the pixel signals for focus detection will be read from the focus detection pixels every two frames. When such settings have been done in the respective registers 210a, 210b, and 210c, the imaging control circuit 210 reads the pixel signals only from each focus detection pixel in the horizontal pixel arrays in the reading range RA every two frames, i.e. for each AF exposure processing.

Figure 7B:
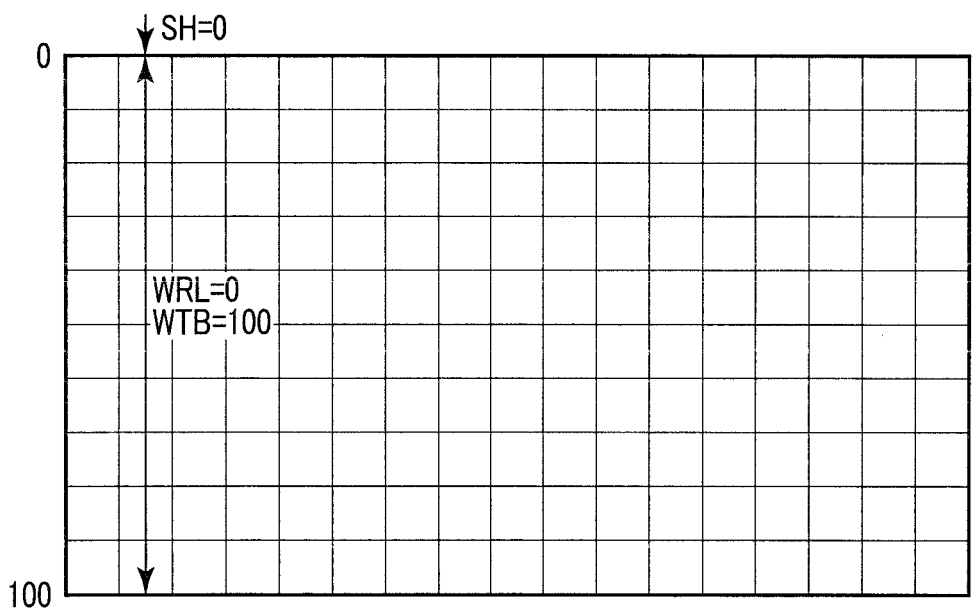
FIG. 7B is a diagram showing a second exemplary setting of the reading range in the all-target mode.

On the other hand, if the imaging scene just before AF exposure is determined to be an imaging scene including a subject that allows for stable detection of horizontal lines, it can be assumed that use of the vertical pixel arrays would enable more precise focus detection. Accordingly, the reading range is set as shown in FIG. 7B. That is, the CPU 216 sets 0 (upper end of the image) to the register 210a of the imaging control circuit 210, as the start position SH. The CPU 216 also sets 0% as the width WRL and 100% as the width WTB to the register 210b of the imaging control circuit 210. The CPU 216 further sets a configuration to the register 210c of the imaging control circuit 210 so that the pixel signals for focus detection will be read from the focus detection pixels every two frames. When such settings have been done in the respective registers 210a, 210b, and 210c, the imaging control circuit 210 reads the pixel signals only from each focus detection pixel in the vertical pixel arrays in the reading range RA every two frames, i.e. for each AF exposure processing.

Figure 7C:
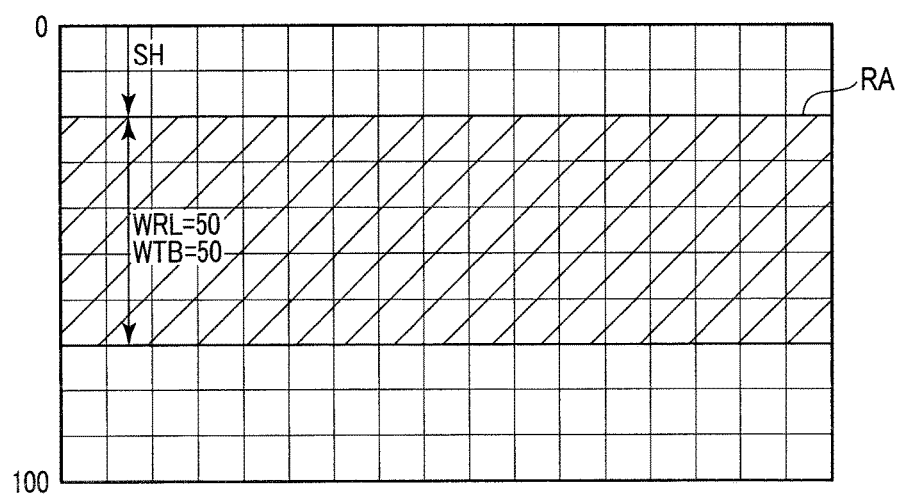
FIG. 7C is a diagram showing a third exemplary setting of the reading range in the all-target mode.

Additionally, if the imaging scene just before AF exposure is determined to be an imaging scene that does not allow for stable detection of either of the vertical lines and horizontal lines, that is, an imaging scene considered to be involving ever-changing conditions of a subject, the reading range RA is set using only the periphery of an area where the presence of the subject is assumed. For example, if there was an area determined to be in the in-focus state in an immediately preceding frame, the reading range is set to cover this area. Also, if a tracking result is available, the start position and the widths of the reading range are set to cover the area of a tracked subject. That is, the CPU 216 sets an upper end position of the subject area to the register 210a of the imaging control circuit 210, as the start position SH. The CPU 216 also sets 50% as the width WRL and 50% as the width WTB to the register 210b of the imaging control circuit 210. The CPU 216 further sets a configuration to the register 210c of the imaging control circuit 210 so that the pixel signals for focus detection will be read from the focus detection pixels every two frames. FIG. 7C shows an exemplary setting of the reading range RA when, for example, a subject is assumed to have been present at the center of a screen. When such settings have been done in the respective registers 210a, 210b, and 210c, the imaging control circuit 210 reads the pixel signals from all the pixels in the reading range RA including the horizontal pixel arrays and the vertical pixel arrays every two frames, i.e. for each AF exposure processing.

Figure 8:
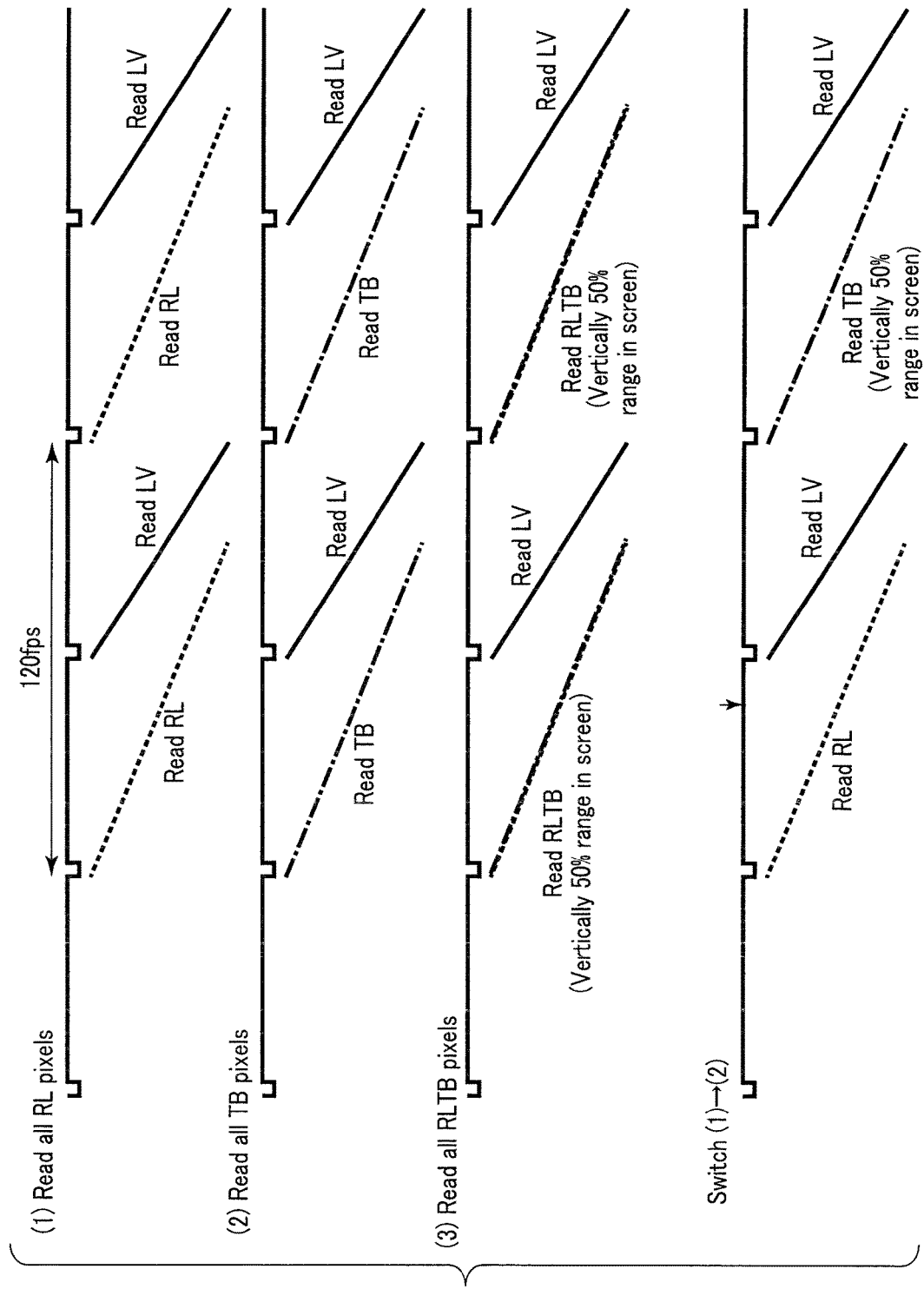
FIG. 8 is a timing chart for reading pixel signals in the exposure processing in the all-target mode.

FIG. 8 is a timing chart for reading pixel signals in the exposure processing in the all-target mode. FIG. 8 transversally indicates the passage of time. Also, FIG. 8 longitudinally indicates read positions for pixel signals. The "Read LV" in FIG. 8 represents the timing to read pixel signals in the live-view exposure processing. The "Read RL" represents the timing to read pixel signals in the AF exposure processing in the case of reading all the RL pixels. The "Read TB" represents the timing to read pixel signals in the AF exposure processing in the case of reading all the TB pixels. The "Read RLTB" represents the timing to read pixel signals in the AF exposure processing in the case of reading all the RLTB pixels.

As already described, reading pixel signals in the live-view exposure processing and reading pixel signals in the AF exposure processing are alternately performed frame by frame. The imaging control circuit 210 starts the operations of exposure and reading pixel signals in synchronization with a synchronization signal that is input for each frame. That is, after the exposure operation, the imaging control circuit 210 reads pixel signals of the subject pixels row by row.

In the case of reading all the RL pixels, the imaging control circuit 210 reads the pixel signals from only the focus detection pixels in the horizontal pixel arrays. In this instance, the read time is half the time required to read pixel signals from all the focus detection pixels. This enables the pixel signals from the focus detection pixels to be read during the live-view display, and fast live-view display and focus detection can both be achieved.

In the case of reading all the TB pixels, the imaging control circuit 210 reads the pixel signals from only the focus detection pixels in the vertical pixel arrays. In this instance, the read time is half the time required to read pixel signals from all the focus detection pixels as in the case of reading all the RL pixels. This enables the pixel signals from the focus detection pixels to be read during the live-view display, and fast live-view display and focus detection can both be achieved.

In the case of reading all the RLTB pixels, the imaging control circuit 210 reads the pixel signals from the horizontal pixel arrays and the vertical pixel arrays, and therefore, all the rows in a range necessary for the focus detection are subjected to reading when the imaging control circuit 210 reads the pixel signals from the focus detection pixels. In this instance, reading the pixel signals from all the focus detection pixels would require twice as much read time as the case of reading all the RL pixels or reading all the TB pixels in the same range. In order to read the pixel arrays for both the RL pixels and the TB pixels for the same length of time as the case of reading all the RL pixels or reading all the TB pixels, reading is performed with a limited range. This enables the pixel signals from the focus detection pixels to be read during the live-view display, and fast live-view display and focus detection can both be achieved.

Here, reading all the RL pixels is effective for a subject that allows for the detection of vertical lines, and not effective for a subject that allows for the detection of only horizontal lines. By contrast, reading all the TB pixels is effective for a subject that allows for the detection of horizontal lines, and not effective for a subject that allows for the detection of only vertical lines. Therefore, when the focus detection is not possible by reading all the RL pixels, it is effective to switch to reading all the TB pixels, and when the focus detection is not possible by reading all the TB pixels, it is effective to switch to reading all the RL pixels. Such switching is enabled only by changing the setting of the register 210a and the register 210b. Moreover, concurrently with such switching, the reading range may be limited to only the neighborhood of an area where the presence of a subject is assumed, as in the case of reading all the RLTB pixels. FIG. 8 shows an example of switching from reading all the RL pixels to reading all the TB pixels, where the width WRL and the width WTB are set to 50% at the time of switching. Note that, as a simpler technique, the imaging control circuit 210 may also be configured to read all the RL pixels and all the TB pixels in an alternating manner.

As described above, according to the present embodiment, ranges for reading pixel signals from the focus detection pixels are limited in accordance with the sizes of focus detection areas. With this, the present embodiment reduces the time to read pixel signals, and can achieve both the fast live-view display and the focus detection.

Also, according to the present embodiment, only the horizontal pixel arrays or the vertical pixel arrays are read in accordance with the conditions of a subject, or the reading ranges for the respective arrays are limited. With this, even when it is difficult to substantially narrow the reading range, the present embodiment reduces the time to read pixel signals, and can achieve both the fast live-view display and the focus detection.

The embodiment has been described with the examples where the reading range is always set. However, if, for example, fast live-view display is not required, setting the reading range may be omitted.

Also, in this embodiment, the start position and the widths are set in relation to the vertical direction of the reading range. This is because the imaging element 208 is configured to read pixel signals row by row. If the imaging element 208 is configured to read pixel signals pixel by pixel, the reading range may be further limited by setting the start position and the widths in relation to not only the vertical direction, but also the horizontal direction.

Additionally, in this embodiment, the register 210a, the register 210b, and the register 210c are provided in the imaging control circuit 210. However, the register 210a, the register 210b, and the register 210c may be provided in, for example, the imaging element 208.

Second Embodiment

Next, the second embodiment of the present invention will be described. The second embodiment is an example of application to live-view HDR processing. The live-view HDR processing refers to a technique to display, as live-view images, images of a broad dynamic range obtained by combining an image of a short exposure time (a dark image) and an image of a long exposure time (a bright image).

Figure 9:
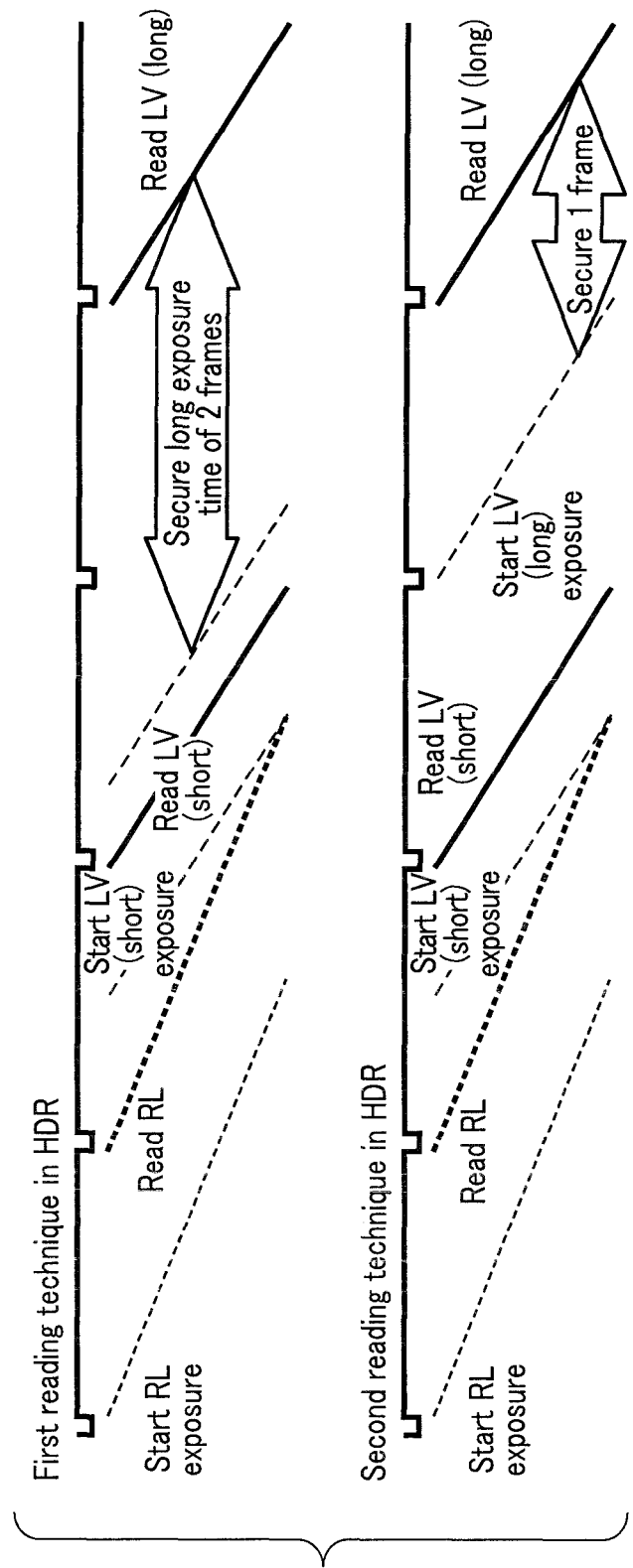
FIG. 9 is a timing chart for reading pixel signals in the exposure processing during live-view HDR processing.

FIG. 9 is a timing chart for reading pixel signals in the exposure processing during live-view HDR processing. Note that FIG. 9 shows an example of reading all the RL pixels. Still, the techniques described with reference to FIG. 9 are applicable also to the cases of reading all the TB pixels and all the RLTB pixels. Additionally, the techniques described with reference to FIG. 9 are applicable also to the cases of setting a focus detection area in the single-target mode or the group-target mode.

The first technique will be described. In the first embodiment, the pixel signals for focus detection are read from the focus detection pixels once in two frames. In contrast, according to the first technique of the second embodiment, the pixel signals for focus detection are read once in four frames. That is, the CPU 216 sets a configuration to the register 210c of the imaging control circuit 210 so that the pixel signals for focus detection will be read from the focus detection pixels every four frames. In this instance, the imaging control circuit 210 reads the pixel signals for focus detection from the focus detection pixels once in four frames. By providing frames for not reading pixel signals, this embodiment can secure a sufficient exposure time for a long exposure.

Next, the second technique will be described. The first technique provides the frames for not reading the pixel signals of the focus detection pixels. On the other hand, according to the second technique of the second embodiment, a minimum time to read pixel signals from the focus detection pixels is secured just before the long exposure for live-view. That is, in the second technique, the CPU 216 sets a configuration to the register 210c of the imaging control circuit 210 so that the pixel signals for focus detection will be read from the focus detection pixels every two frames, as in the first embodiment. In this instance, the imaging control circuit 210 reads the pixel signals for focus detection from the focus detection pixels once in two frames. However, at the timing just before the long exposure, the imaging control circuit 210 performs only the least possible reading of the pixel signals for focus detection. By minimizing the reading time just before the long exposure, the long exposure can be immediately started thereafter. Also, by allowing the reading operation to be always performed, the processing of the imaging control circuit 210 can be prevented from becoming complicated.

Third Embodiment

Next, the third embodiment of the present invention will be described. The third embodiment is a technique to reduce the power at the time of reading pixel signals.

Figure 10:
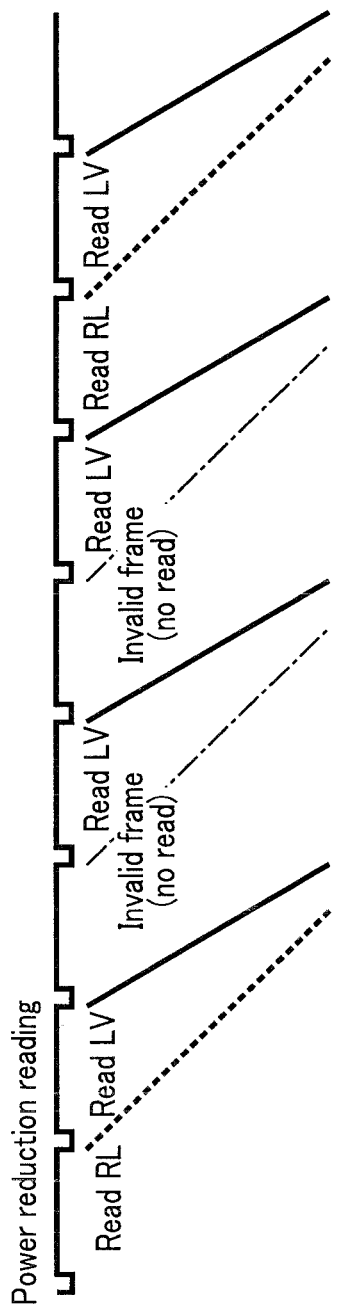
FIG. 10 is a timing chart for reading pixel signals in power reduction exposure processing.

FIG. 10 is a timing chart for reading pixel signals in power reduction exposure processing. Note that FIG. 10 shows an example of reading all the RL pixels. Still, the technique described with reference to FIG. 10 is applicable also to the cases of reading all the TB pixels and all the RLTB pixels. Additionally, the technique described with reference to FIG. 10 is applicable also to the cases of setting a focus detection area in the single-target mode or the group-target mode.

In this embodiment, for the sake of power reduction, invalid frames are provided as the frames for not reading pixel signals from the focus detection pixels. For example, the CPU 216 sets a configuration to the register 210c of the imaging control circuit 210 so that the pixel signals for focus detection will be read from the focus detection pixels for two frames out of six frames. In the invalid frames, the imaging control circuit 210 does not read the pixel signals for focus detection. By providing such invalid frames, the power is reduced to approximately four-sixth.

As described above, according to this embodiment, power can be reduced by providing invalid frames.

The processing described in relation to the above embodiments may be stored in the form of a program executable by the CPU 216. Also, the program can be stored in a storage medium of external storage devices, such as a memory card (ROM card, RAM card, etc.), a magnetic disk (hard disk, etc.), an optical disk (CD-ROM, DVD, etc.) and a semiconductor memory, and can be distributed. Then, the CPU 216 reads the program from the storage medium of external storage devices and can perform the processing described above by being controlled based on the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging element including a plurality of imaging pixels each with a light receiver and a plurality of focus detection pixels each with a light receiver including an opening position different from opening positions in the imaging pixels, the focus detection pixels comprising a first focus detection pixel in which the opening position is shifted in a first direction compared to the opening positions in the imaging pixels and a second focus detection pixel in which the opening position is shifted in a second direction different from the first direction compared to the opening positions in the imaging pixels, the imaging element comprising:
   a reading circuit configured to read pixel signals from the imaging pixels or the focus detection pixels;
   a reading range setting circuit configured to set a reading range for the reading circuit to read the pixel signals from the focus detection pixels; and
   a read pixel setting circuit configured to set either or both of the first focus detection pixels and the second focus detection pixels for the reading circuit to read the pixel signals,
   wherein the reading circuit reads the pixel signals based on the setting of the read pixel setting circuit, and
   the reading range setting circuit sets the reading range for reading the pixel signals from both of the first focus detection pixels and the second focus detection pixels to be narrower than the reading range for reading the pixels signals from the first focus detection pixels or the second focus detection pixels.

2. The imaging element according to claim 1, wherein the reading range setting circuit sets the reading range in a direction orthogonal to a direction of reading the pixel signals.

3. The imaging element according to claim 2, wherein the reading range setting circuit sets the reading range in a direction that is the same as the direction of reading the pixel signals.

4. The imaging element according to claim 1, wherein the reading range setting circuit comprises a register.

5. The imaging element according to claim 1 wherein the read pixel setting circuit is configured to set (A) the first focus detection pixels, (B) the second focus detection pixels, or (C) both the first focus detection pixels and the second focus detection pixels, for the reading circuit to read the pixel signals based on at least one determination of (1) whether or not a scene captured by the imaging element includes a subject that allows for stable detection of vertical lines, and/or (2) whether or not the scene captured by the imaging element includes a subject that allows for stable detection of horizontal lines.

6. The imaging element according to claim 1 wherein the reading range setting circuit sets the reading range for the reading circuit to read the pixel signals from the focus detection pixels based, at least in part, on an autofocus target mode set.

7. The imaging element of claim 6 wherein the autofocus target mode set is selected from (A) a single-target mode, (B) a group-target mode, or (C) an all-target mode.

8. The imaging element of claim 1 wherein the reading range setting circuit and the read pixel setting circuit reduce a number of focus detection pixels read such that a faster frame rate of image pixels is available for a live view display, than would be possible if the number of focus detection pixels read was not reduced.

9. The imaging element of claim 8 wherein the frame rate of image pixels available for a live view display is at least 120 frames per second.

\* \* \* \* \*